United States Patent [19]

Fujiwara et al.

[11] Patent Number: 5,478,012
[45] Date of Patent: Dec. 26, 1995

[54] THERMALLY-ACTUATED STEAM TRAP

[75] Inventors: Yoshiyasu Fujiwara; Hideaki Yumoto, both of Kakogawa, Japan

[73] Assignee: TLV Co., Ltd., Kakogawa, Japan

[21] Appl. No.: 412,357

[22] Filed: Mar. 24, 1995

Related U.S. Application Data

[63] Continuation of Ser. No. 84,383, Jun. 29, 1993, abandoned.

[30] Foreign Application Priority Data

Jul. 15, 1992 [JP] Japan ................................ 4-212000
Aug. 12, 1992 [JP] Japan ................................ 4-237676

[51] Int. Cl.$^6$ ....................................................... F16T 1/10
[52] U.S. Cl. .......................................... 236/58; 236/93 A
[58] Field of Search ............................ 236/56, 58, 93 A, 236/99 J

[56] References Cited

U.S. PATENT DOCUMENTS

| 3,698,633 | 10/1972 | Lingnau ................................... 236/99 |
| 4,161,278 | 7/1979 | Klann et al. ............................. 236/56 |
| 5,197,669 | 3/1993 | Yumoto .................................... 236/58 |
| 5,275,334 | 1/1994 | Yumoto ............................. 236/99 J X |

FOREIGN PATENT DOCUMENTS 3124459  1/1983  Germany .
3447999  1/1986  Germany ................................ 236/56

*Primary Examiner*—William E. Tapolcai
*Attorney, Agent, or Firm*—Jordan and Hamburg

[57]  ABSTRACT

In a thermally-actuated steam trap, a valve casing is formed therein with an inlet, a valve chest and an outlet, and a valve seat member is disposed between the valve chest and the outlet. Within the valve chest, there is further provided a temperature control element including two disk-like wall members and a diaphragm member provided between the wall members. The diaphragm member is secured at the peripheral edge to both the wall members, and the inner space formed thereby accommodates an expansible medium. The diaphragm member carries a valve member cooperating with the valve seat member at the side opposite the expansible medium side, and in the central region of the valve member directed toward the diaphragm member is provided a recess portion which becomes deeper as it proceeds toward the center. At least one sheet of the diaphragm member is held between the valve member and a holding member formed substantially corresponding to the space within the recess, and the valve member, diaphragm sheet and holding member are welded with each other in the region where the diaphragm sheet is held between the recess of the valve member and the holding member.

6 Claims, 3 Drawing Sheets

THERMALLY-ACTUATED STEAM TRAP

This application is a continuation of application Ser. No. 08/084,383, filed Jun. 29, 1993, now abandoned.

BACKGROUND OF THE INVENTION

1. Field of the Invention

The present invention relates to a steam trap for automatically discharging condensate generated in various kinds of steam using equipment and steam pipe lines, and, more particularly, to a thermally-actuated steam trap adapted to discharge the condensate below a desired temperature out of a system by using a temperature control element including a medium which is heated and expanded by steam and cooled and contracted by condensate.

2. Description of the Prior Art

The temperature control element used for a steam trap comprises two disk-like wall members and a diaphragm member provided between the wall members, the diaphragm member being secured at its outer peripheral edge to both the wall members, and the inner space formed thereby accommodating an expansible medium which changes in volume corresponding to the temperature of the fluid which comes into contact with the medium through the diaphragm member. Further, a valve member which cooperates with a valve seat member is carried on the diaphragm member at the side opposite to the expansible medium side.

In the steam trap provided with such a temperature control element, the temperature control element is disposed within a valve chest connected to an inlet, and the valve member carried on the diaphragm member is moved utilizing the expansion and contraction of the expansible medium to thereby bring the valve member into and out of seating engagement with the valve seat member having a discharge passage communicating with the valve chest and an outlet.

When the steam trap is closed, the inner pressure generated by the expansible medium within the temperature control element overcomes the tensile force of the diaphragm to cause the diaphragm to be deflected. This inner pressure depends upon the temperature and working pressure of the condensate to be discharged or of the steam not to be discharged, as is widely known.

Various proposals have hitherto been made to attach the valve member to the diaphragm member.

For example, U.S. Pat. No. 3,698,633 (corresponding to DE P2038344 or JP-B-Sho 51-21174 (1976)) discloses the fact that the valve member is welded to the diaphragm member at the annular jointing portion which encloses the periphery in the vicinity of a central plug, and the diaphragm member encloses the annular jointing portion concentrically and is provided in a stretched manner between the clamping surfaces of the valve member and holding plate provided in opposite relation to each other.

In this prior art, the diaphragm and the valve member are evenly welded at their flat central portions with each other by a central annular seam. Moreover, the diaphragm is held at the outer annular portion between the valve member and the holding plate. To this end, caulking of the holding plate and the valve member is performed.

In order to avoid such a caulking operation and further avoid a situation in which expansion and contraction of the diaphragm, when welded, reach up to the region where movement of strokes of the diaphragm is performed, thereby causing deformation or residual stress in the region, U.S. Pat. No. 4,161,278 (corresponding to DE-P2630038 and JP-B-Sho 60-46318 (1985)) discloses the fact that the edge portions of the diaphragm sheet and holding plate adjacent to the central openings are formed so as to correspond to the outer peripheral surface of the central annular raised portion of the valve member, and the valve member, the diaphragm sheet and the holding plate are welded and sealed with each other at the above-mentioned edge of the annular raised portion.

However, with such a welding manner, it is difficult to hold the valve member, diaphragm sheet and holding plate in their welding positions without any clearances left therebetween, because in welding, after the inner peripheral edge of the diaphragm sheet is aligned to the outer peripheral surface of the raised portion of the valve member, the holding plate is placed thereon and then the welding is performed while pressing the holding plate thereto, thus causing the edges of the holding plate and diaphragm sheet to be apt to float. This impairs the condition of intimate contact between the ends of the members, causing faulty welding. If the wall of the holding plate is thickened, such a floating of the edge portions can be considerably improved, however, in such a case, the holding plate exists in the space where the expansible medium for the temperature control element is accommodated, and the space requires a given volume or a greater volume for accommodating the expansible medium, thereby resulting in a temperature control element greater in size. In addition, when it is attempted to align the inner peripheral edge of the thin diaphragm sheet with the outer peripheral surface of the raised portion of the valve member, the end of the sheet is subjected to a force which pulls the sheet outwardly, so that it is difficult for the inner peripheral edge of the sheet to come closely into contact with the outer peripheral surface of the annular raised portion over the entire periphery.

Moreover, German patent No. 3124459 (DE 3124459 C2) discloses the fact that the diaphragm and fastening plate, each having a hole in the center thereof, and the side of the valve member directed toward the diaphragm and having an undercut blind hole are welded with each other at their inner peripheral edges. However, with such a practice, precisely aligning the edge of the diaphragm with the portion to be welded is difficult, and some influence due to expansion and contraction of the diaphragm when welded can not be prevented from being exerted on the region where movement of strokes of the diaphragm is performed.

SUMMARY OF THE INVENTION

It is an object of the invention to provide a steam trap of the type as described in the beginning, which avoids the above-mentioned problems in the prior art concerning the securing between a valve member and a diaphragm of the steam trap discharging condensate, while avoiding any leakage of steam, by the expansion and contraction of an expansible medium accommodated in a temperature control element, and in which it is easy to secure the valve member to the diaphragm member and, the diaphragm member nevertheless having a long lifetime.

It is another object of the invention to provide a steam trap on which an influence due to the radial expansion and contraction of the diaphragm member caused by the heating and cooling when welded is not exerted up to the portion of the diaphragm member which performs movement of strokes.

It is a further object of the invention to provide a steam trap in which it is easy to align the valve member with the diaphragm in a position to be welded and which ensures that the valve member and diaphragm come into close contact with each other.

It is a still further object of the invention to provide a steam trap which ensures the space accommodating an expansible medium without making a temperature control element greater in size.

In order to achieve the above-mentioned objects, according to the invention, there is provided a steam trap comprising:

a valve casing having an inlet, a valve chest and an outlet;

a valve seat member disposed between the valve chest and the outlet and having a discharge passage;

a temperature control element disposed in the valve chest and including two disk-like wall members and a diaphragm member provided between said disk-like wall members, said diaphragm member being secured at the outer lateral edge to both the wall members, and the inner space formed thereby accommodating an expansible medium;

a valve member carried on the diaphragm member opposite the expansible medium side and adapted to cooperate with said valve seat member, said valve member having a recess in the central region thereof directed toward the diaphragm member, which becomes deeper as the recess proceeds toward the center;

a holding member formed substantially corresponding to the space within said recess;

at least one sheet of said diaphragm member being held between the holding member and the valve member;

said valve member, diaphragm member and holding member being welded with each other in the region where the diaphragm sheet is held between the recess of the valve member and the holding member.

Since the valve member, diaphragm member and holding member are welded with each other in the region where the diaphragm sheet is held between the recess of the valve member and the holding member, the radial expansion and contraction of the diaphragm member due to the heating and cooling thereof when welded is limited to the portion held by the valve member and the holding member, and, therefore, the horizontal portion of the diaphragm member which performs the movement of strokes is not subjected to deformation due to welding; thus, the flexibility of the diaphragm member remains the same as before welding.

Since the holding member is formed in such a manner as to correspond to the space within the recess of the valve member and the diaphragm sheet is held by the holding member and the valve member, the sheet under question is subjected to a force pulling it toward the center thereof, and therefore, even in the case where the diaphragm has a central opening and is welded at the edge of the opening, alignment of the valve member and the diaphragm in the position to be welded is easy and the valve member and the diaphragm are brought into close contact with each other.

Further, since the valve member is positioned on the diaphragm member opposite the expansible medium side and is provided with the recess in the central region thereof directed toward the diaphragm member, a space accommodating the expansible medium is ensured without enlarging the temperature control element in spite of the existence of the holding member.

Preferably, at least one of the valve member and holding member has an annular projection in a region where the diaphragm sheet is held, and resistance welding of the valve member, diaphragm sheet and holding member with each other is performed in the position of said annular projection.

Alternatively, the valve member preferably has a thin annular portion in the direction of the depth of said recess, and laser welding of the valve member, diaphragm sheet and holding member with each other is performed in said thin annular portion.

Alternatively, the diaphragm sheet held therebetween and at least one of the valve member and holding member have the respective central through openings, the valve member or the holding member having no central opening has a blind hole at the side opposite thereto, and arc welding of the valve member, diaphragm sheet and holding member with each other is performed in the region of the edges which comes in contact with said central opening or blind hole.

DETAILED DESCRIPTION OF PREFERRED EMBODIMENTS

The present invention will now be concretely explained by way of embodiments.

A thermally-actuated steam trap is classified into two types, one a so-called failure-closed type steam trap which prevents a leakage of steam by closing a discharge passage in case a temperature control element is damaged and an expansible medium flows out therefrom, and the other a so-called failure-opened type steam trap in which a discharge passage is opened to thereby discharge condensate when a temperature control element is damaged, as disclosed in, for example, U.S. Pat. No. 5,197,669 or AU-B-638184. The following embodiments will be explained mainly based on the failure-opened type steam trap; however, holding a diaphragm sheet between a valve member and a holding member and welding the three of them with each other also provides the similar effects for the failure-closed type steam trap.

Figure 1:
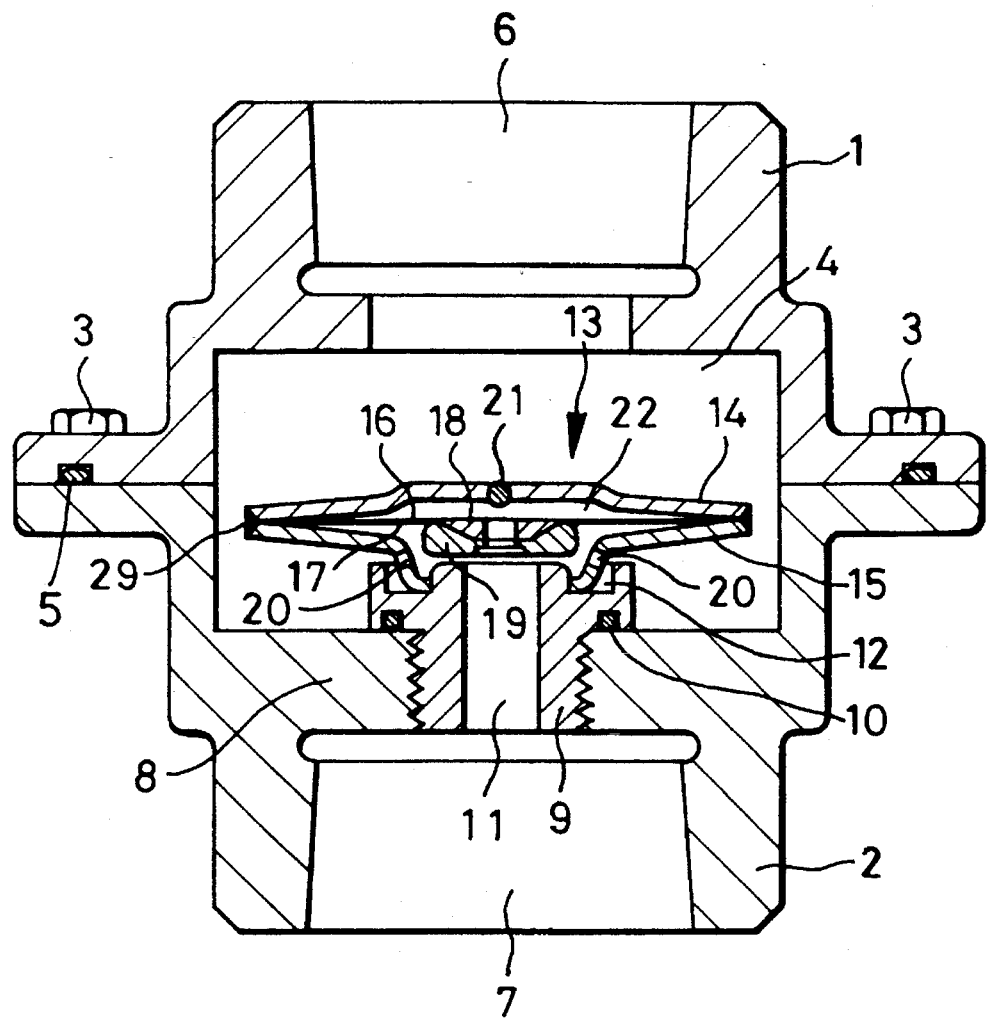
FIG. 1 is a sectional view of a thermally-actuated steam trap according to an embodiment of the present invention.

Referring to FIG. 1, a valve casing having a valve chest 4 therein is formed by fastening an upper casing 1 and a lower casing 2 by means of bolts 3. Airtightness between both the casings 1 and 2 is maintained with an annular gasket 5. An inlet 6 is formed at the upper casing 1 and an outlet 7 at the lower casing 2.

A valve seat member 9 is threadably connected to a partition wall 8 between the valve chest 4 and the outlet 7. Airtightness between the partition wall 8 and the valve seat member 9 is maintained with an annular gasket 10. The valve seat member 9 is formed in the center thereof with a penetrating discharge passage 11 communicating with the valve chest 4 and outlet 7. An annular groove 12 is formed on the upper surface of the valve seat member 9.

Further, a temperature control element 13 is disposed above the valve seat member 9. The temperature control element 13 comprises a wall member 14, an attaching member 15 as a lower wall member, and, further comprises, as shown in FIGS. 2 and 3 in detail, a first diaphragm 16, a second diaphragm 17, a holding member 18 and a valve member 19.

The wall member 14, first diaphragm 16, second diaphragm 17 and attaching member 15 are welded and secured at their outer peripheral edges with each other in a position indicated by reference numeral 29, and the bent-down edge of the opening of the attaching member 15 is secured to the annular groove 12. The attaching member 15 is formed with a plurality of windows 20 which allows fluid to pass. The first diaphragm 16 may be composed of a plurality of diaphragm sheets for an increase in strength.

An expansible medium 22 is poured from a pouring hole 21 into the space formed by the wall member 14 and the first diaphragm 16, and the space is sealed by covering the pouring hole 21. The expansible medium 22 consists of water, liquid having a boiling point lower than that of water or a mixture thereof.

Figure 2:
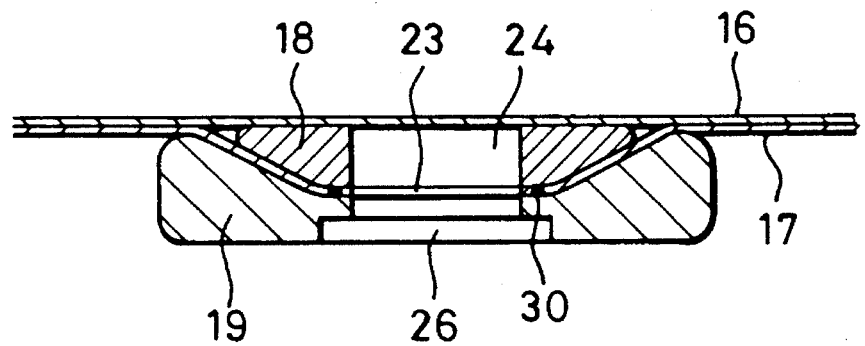
FIG. 2 is an enlarged sectional view illustrating a condition of holding a diaphragm between a valve member and a holding member shown in FIG. 1.
Figure 3:
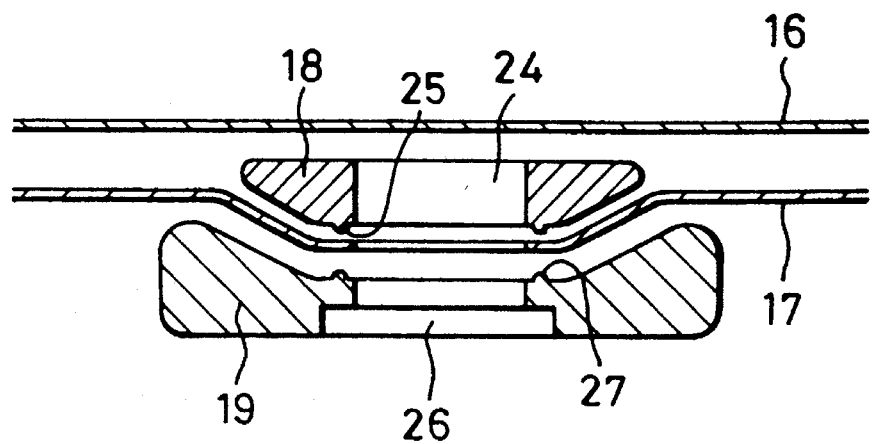
FIG. 3 is a sectional view illustrating a condition corresponding to FIG. 2, but before welding.

As shown in FIG. 2, in the central region of the valve member 19 directed toward the diaphragm is provided a recess which becomes deeper as it proceeds toward the center, and further, a stepped through-hole 26 is provided up to the opposite side of the recess. The holding member 18 with a through-hole 24 in the central portion is formed substantially corresponding to the space within the recess. The second diaphragm 17 having a through-hole 23 corresponding to the through-hole 24 of the holding member 18 is held between the valve member 19 and the holding member 18, so that the region of the second diaphragm 17 held therebetween is forced down as shown in the drawings. The second diaphragm 17 may also be composed of a plurality of diaphragm sheets for increasing its strength. The valve member 19, second diaphragm 17 and holding member 18 are welded and secured with each other in a position indicated by reference numeral 30 in a region where the second diaphragm 17 is held.

As shown in FIG. 3, this securing is realized by butting an annular projection 25 on the lower surface of the holding member 18 outside the through hole 24 and an annular projection 27 on the upper surface of the valve member 19 outside the stepped through-hole 26 through the second diaphragm 17 and then performing projection welding. All of the annular projections may be positioned in any position within the region where the second diaphragm 17 is held therebetween, or only one annular projection may be positioned on any one of the valve member and holding member.

The steam trap of the embodiment will be operated as described below. In the case where the fluid flowing from the inlet 6 into the valve chest 4 is steam at a high temperature, the expansible medium 22 expands to thereby displace the valve member 19 downward through the first and second diaphragms 16 and 17, so that the valve member 19 is brought into a seating engagement with the valve seat member 9 to close the discharge passage 11, thereby preventing steam from leaking out.

In the case where the temperature of the fluid is lower than a predetermined value or a condensate at a low temperature flows from the inlet, the expansible medium 22 contracts and the valve member 19, with the pressure of the fluid from the inlet also applied thereto, is brought out of the seating engagement with the valve seat member 9 to open the discharge passage 11, thereby discharging the condensate out of the outlet 17.

In the present embodiment, the temperature control element will be damaged in two situations, one where the first diaphragm 16 is damaged and the other where the second diaphragm 17 is damaged. When the first diaphragm 16 is damaged, the space filled with the expansible medium 22 is caused to communicate with the outlet 7 from between the first and second diaphragms 16 and 17 through the through holes 23, 24, 26 and the discharge passage 11. Thereby, the expansible medium 22 flows out through the outlet 7. Further, the valve member 19 is forced up together with the second diaphragm 17 by the pressure of the fluid from the inlet and moved away from the valve seat member 9 to open the discharge passage 11, thereby opening the valve. When the second diaphragm 17 is damaged, the inlet 6 is caused to communicate with the outlet 7 from between the first and second diaphragms through the through holes 23, 24, 26 and discharge passage 11, thereby allowing the fluid at the inlet side to be discharged.

Also when the pressure at the outlet side has become higher than that at the inlet side, the fluid from the outlet side is caused to flow through the respective through-holes provided in the valve body 19, second diaphragm 17 and holding member 18 into between the second diaphragm 17 and the first diaphragm 16, to displace the second diaphragm 17 toward the valve seat member 9, so that the valve member 19 is forced to close the discharge passage 11, thereby preventing the fluid from flowing in reverse towards the inlet side.

Figure 4:
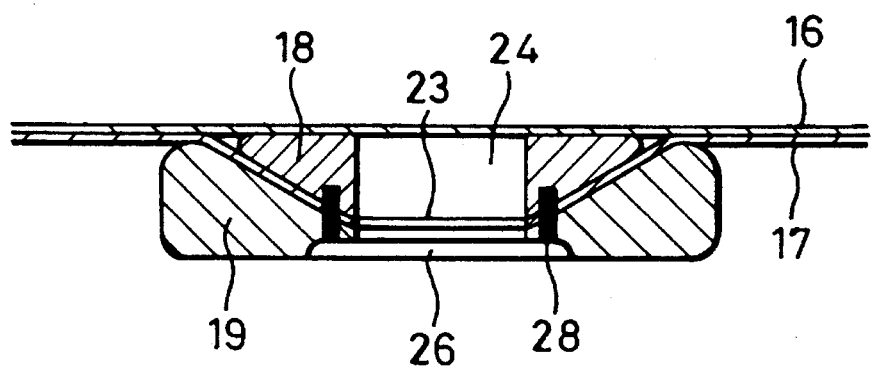
FIG. 4 is a sectional view for explaining a welded condition different from in FIG. 2.

FIG. 4 shows a situation of holding the second diaphragm in a different welding manner. Laser welding is annularly performed in a horizontal portion of the valve member 19 which is thinned due to the step of the through-hole 26, in the position designated with reference numeral 28, so that the valve member 19, second diaphragm 17 and holding member 18 are secured to each other.

Figure 5:
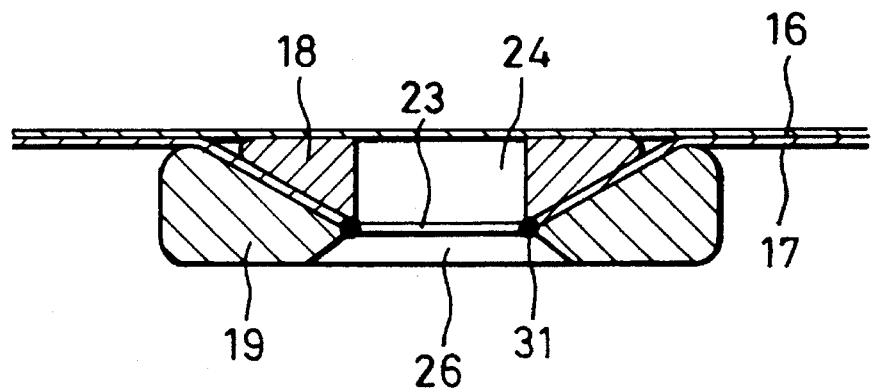
FIG. 5 is a sectional view for explaining a further welded condition.

FIG. 5 shows a situation of holding the second diaphragm in a further different manner. The upper peripheral edge of the through-hole 26 of the valve member 19, the peripheral edge of the through-hole 23 of the second diaphragm 17 and the lower peripheral edge of the through-hole 24 of the holding member 18 are precisely aligned with each other at the position designated with reference numeral 31, and TIC (tungsten-arc inert-gas welding) is performed.

Figure 6:
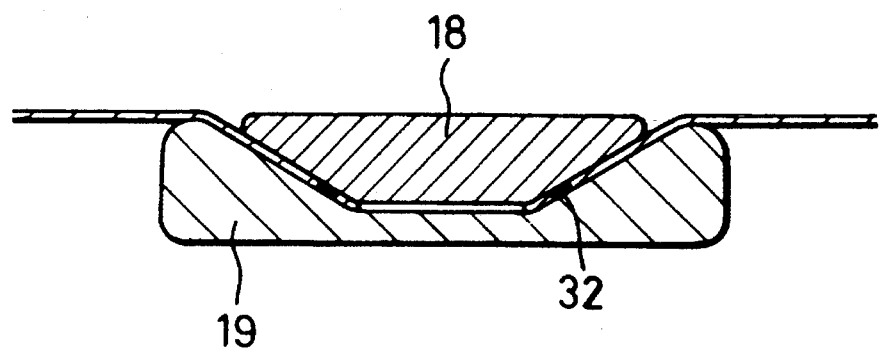
FIG. 6 is a sectional view corresponding to FIG. 2, but showing a so-called failure-closed type steam trap.
Figure 7:
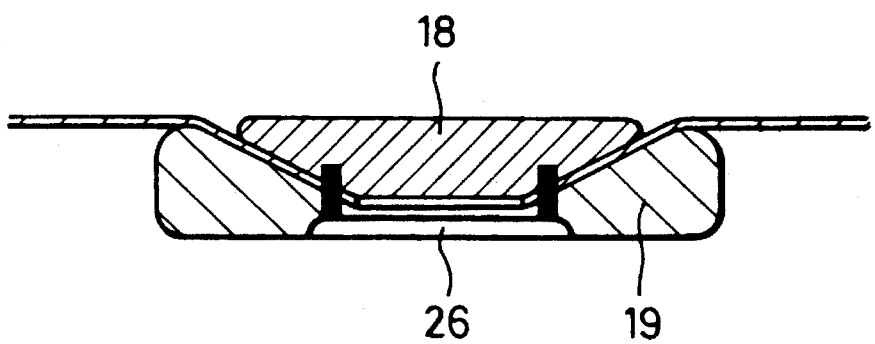
FIG. 7 is a sectional view corresponding to FIG. 4, but showing similarly a failure-closed type steam trap.
Figure 8:
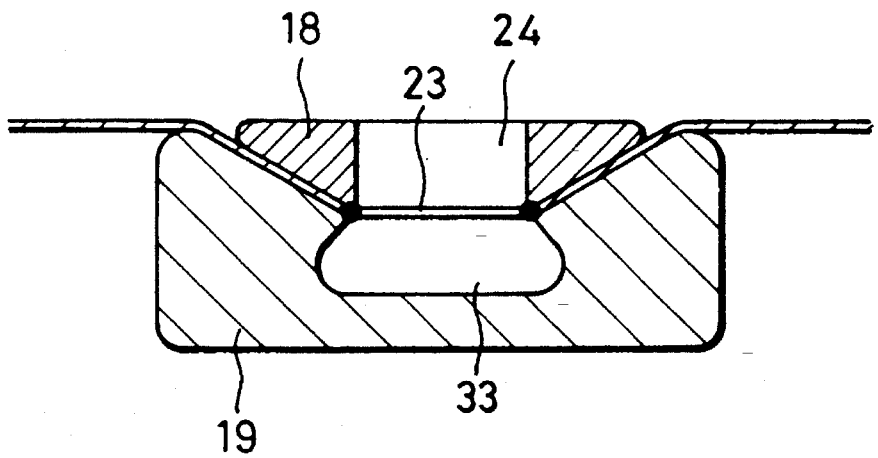
FIG. 8 is a sectional view corresponding to FIG. 5, but showing a failure-closed type steam trap.

FIGS. 6, 7 and 8 show the situations of holding the diaphragm of the failure-closed type steam trap corresponding to FIGS. 2, 4 and 5. In this type of steam trap, when the temperature control element is damaged to thereby cause the expansible medium to flow out, the valve member is brought into a seating engagement with the valve seat member by the pressure of the fluid at the inlet side to close the discharge passage, thereby preventing steam from leaking out, and it is therefore necessary for at least any one of the valve member and holding member to have no hole. In the resistance welding type shown in FIG. 6, welding is performed on the opposite inclined surfaces of the valve member 19 and holding member 18, at a position designated with reference numeral 32. In the laser welding type shown in FIG. 7, the valve member 19 has a stepped through-hole 26 and has a thickness which is thinned due to the step, so that the laser welding is performed in a better manner. The valve member 19, diaphragm and holding member 18 are welded and secured to each other in the horizontal thinned portion. In the failure-closed type steam trap, it is not originally necessary for the diaphragm to have a central opening; however, as shown in FIG. 8, in the case of arc welding, the diaphragm has a through-hole 23 at the center and, corresponding to this, the holding member 18 also has a central through-hole 24, and the valve member 19 has an undercut center blind hole 33 at the side directed toward the holding member, so that welding is performed in the adjacent peripheral edges of the through-holes 23, 24 and the blind hole 33.

What is claimed:

1. A steam trap comprising:

a valve casing having an inlet, a valve chest and an outlet;

a valve seat member disposed between the valve chest and the outlet and having a discharge passage;

a temperature control element disposed in the valve chest and including two disk-like wall members and a diaphragm member provided between said disk-like wall members, said diaphragm member being secured at an outer lateral edge thereof to both the disk-like wall members and defining an inner space formed between a first side of said diaphragm member and a first one of said disk-like wall members accommodating an expansible medium therein;

a valve member carried on a second side of said diaphragm member, opposite the first side, and adapted to cooperate with said valve seat member, said valve member defining a recess disposed in the central region having an opening thereof directed towards the diaphragm member, said recess being defined by a frustroconical surface of said valve member whereby said recess becomes deeper as said recess proceeds towards the center and having a widest portion thereof adjacent to said diaphragm member;

a holding member having a shape thereof substantially corresponding to the frustroconical surface of said recess, said holding member being oriented for complemental reception within said recess;

said diaphragm member having at least one sheet held between juxtaposed surfaces of the holding member and the recess of the valve member;

said valve member, said at least one sheet of said diaphragm member and said holding member being welded with each other in the region where said at least one sheet of said diaphragm sheet is held between said juxtaposed surfaces of the recess of the valve member and the holding member; and a second one of said disk-like wall members having at least one opening therethrough for the passage of steam.

2. A thermally-actuated steam trap as claimed in claim 1, wherein at least one of said valve member and holding member has an annular projection in a region where the diaphragm sheet is held, and resistance welding of the valve member, diaphragm sheet and holding member with each other is performed in the position of said annular projection.

3. A thermally-actuated steam trap as claimed in claim 1, wherein said valve member has preferably a thin annular portion in the direction of the depth of said recess, and laser welding of the valve member, diaphragm sheet and holding member with each other is performed in said thin annular port ion.

4. A thermally-actuated steam trap as claimed in claim 1, wherein said diaphragm sheet held therebetween and at least one of said valve member and holding member have the respective central through-openings, the valve member or the holding member having no central opening has a blind hole at the side opposite thereto, and arc welding of the valve member, diaphragm sheet and holding member with each other is performed in the region of the edges which comes into contact with said central opening or blind hole.

5. A thermally-actuated steam trap as claimed in claim 1, wherein a diameter of said recess in said valve member decreases in a direction along said valve casing from said inlet to said outlet.

6. A thermally-actuated steam trap as claimed in claim 1, wherein an inner edge of any sheet of said diaphragm member fitted into the space within said recess terminates radially outwardly of said discharge passage.

\* \* \* \* \*